UNITED STATES PATENT OFFICE.

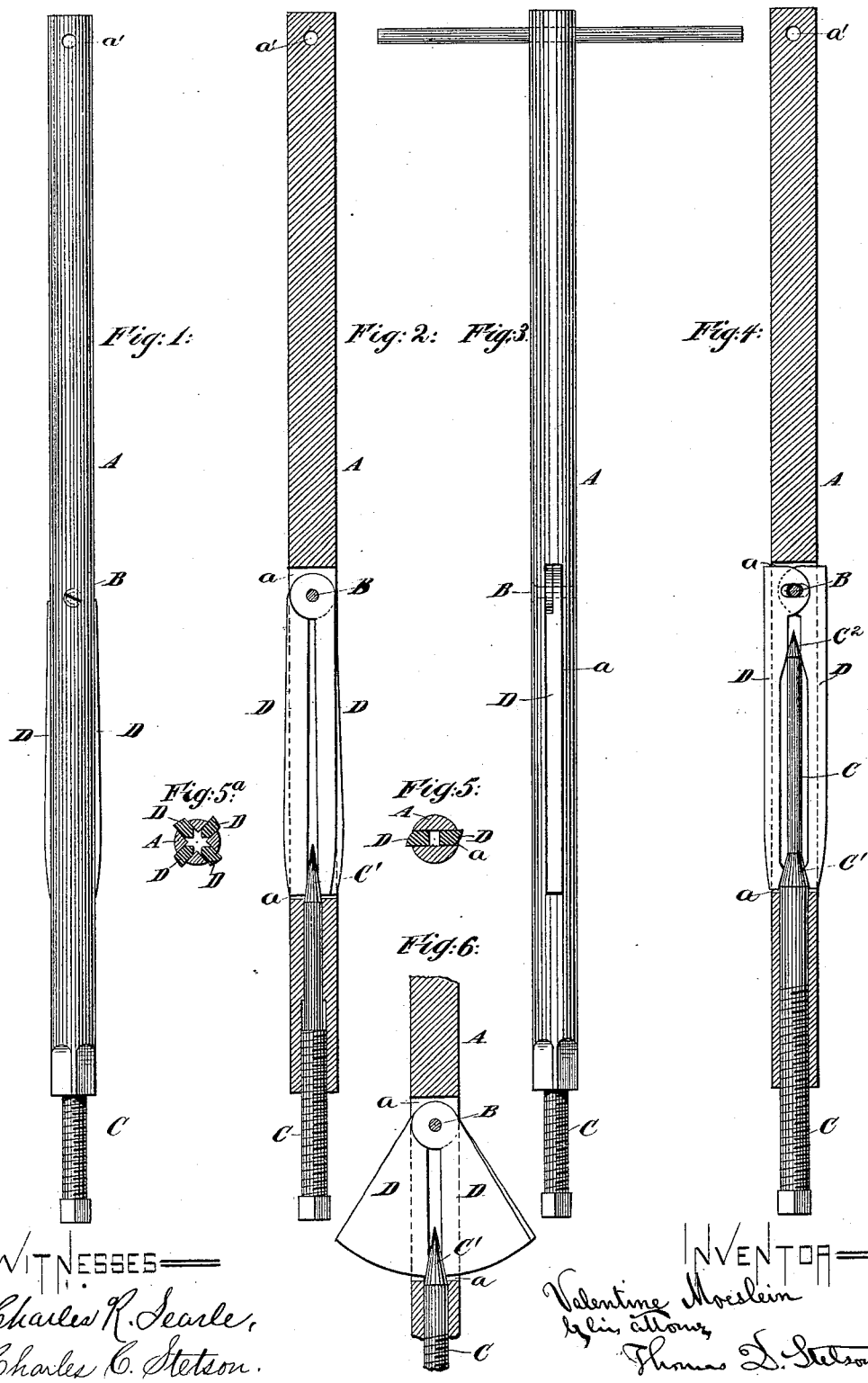

VALENTINE MOESLEIN, OF BROOKLYN, ASSIGNOR TO JOHN THORNTON, JR., OF NEW YORK, N. Y.

EXPANDING REAMER.

SPECIFICATION forming part of Letters Patent No. 265,272, dated October 3, 1882.

Application filed June 23, 1882. (No model.)

*To all whom it may concern:*

Be it known that I, VALENTINE MOESLEIN, a citizen of Germany, residing in Brooklyn, Kings county, in the State of New York, have invented certain new and useful Improvements in Expanding Reamers, of which the following is a specification.

My improved reamer may be made in many sizes and used for many purposes where it is desired to smooth, true, straighten, bevel, or enlarge holes. It may be formed with different numbers of slots and cutters. I will describe it as made of small size and formed with one slot, and provided with two cutters adapted to finish straight cylindrical holes.

The accompanying drawings form a part of this specification, and represent what I consider the best means of carrying out the invention.

Figure 1 is a side view, and Fig. 2 is a central longitudinal section. Figs. 3 and 4 represent a modification. Fig. 3 is an elevation, and Fig. 4 is a central longitudinal section. Fig. 5 is a cross-section through the form shown in Figs. 1 and 2. Fig. 5$^a$ is a cross-section showing a modification in which four cutters are employed. Fig. 6 is a central longitudinal section, showing a modification adapted for countersinking or producing tapering ends of holes.

Similar letters indicate corresponding parts in all the figures.

I provide a screw with a conical point mounted in the axis of the arbor or reamer-bar. I produce a carefully-finished slot through the bar at the center of its length, or at any other convenient point in its length, and mount therein two cutters, each carefully formed of a proper thickness to exactly fill the width of the slot throughout a great portion of its length. The ends nearest the screw are forced apart to a greater or less extent by the conical point of the screw, which is driven inward to adjust the cutters outward, and is drawn out to relax the force on the cutters and allow them to move inward. Each cutter is, at the end farthest from the adjusting-screw, reduced to a little less than half the thickness of the slot, and the two cutters are applied side by side at that point, and are pivoted together and to the reamer-bar. It follows that the main effective portion of each cutter is adjusted outward and inward by the screw, while one end of each cutter is hinged to the bar by means of the bolt. The bolt is screw-threaded, and can be easily removed to allow the cutters to be taken out for grinding or alterations.

In the drawings, A is the reamer-bar, and $a$ a long slot, with exactly-parallel sides, extending through the center of A.

B is a bolt or transverse pin, extending across the slot through the thin superposed ends of the cutters D.

C is an axial screw, having at its outer end a convenient head for engaging it to effect the required turning motion for adjusting in either direction. Its inner end, C', is conical. The ends of the cutters C adjacent to the conical end C' of this screw are properly formed to match to and be forced out by the conical point of the screw C, and turning the screw C in the direction to force it in serves to force the cutters outward. The outer faces serve as the cutting-edges, and are carefully ground with the proper bevel. They extend just sufficiently beyond the exterior of the reamer-bar A, and the bar being strongly turned by a lathe or other means, the cutters ream the hole in a sewing-machine, or any other machine in which the reamer-bar may be operated.

Near one end of the reamer-bar A is a hole, $a'$, which receives a transverse pin engaged with the face-plate of a lathe. (Not represented.) The opposite end of the reamer-bar cannot be thus equipped by reason of the presence of the adjusting-screw C in the center. I propose to simply square that end or to flatten one side thereof to afford facilities for getting hold of it with any suitable wrench or coupling, and giving the reamer-bar the required rotary motion.

The main portion of the slot $a$ may be effected by milling-tools. The portion not removed by the milling-wheel may be removed by filing with a thin file, or by any other suitable tool. The cutters D are of such thickness as to exactly fill the slot $a$ without any rattling or looseness. The contour of the cutters in any given case may be determined by trial. Such form should be adopted as will act efficiently when the cutters are forced out or expanded to the proper extent.

My improved reamer may be operated by hand, either end being inserted foremost in the hole. If the end having the hole $a$ is uppermost, the bar may be engaged by inserting a hard wire to extend through the hole $a$, and the bar may be turned either by such wire directly, or by a handle to which the wire or an equivalent pin may be connected. When for any reason it is preferred to work the bar with the other end uppermost the end then presented at the top may be engaged by a transverse handle having a pinching-screw or other device to take hold of the squared or partially squared end of the bar A there shown.

The screw C may be seized by a forked wrench, or by any suitable tool, to adjust it in either direction.

Modifications may be made in the forms and proportions. I can use only one cutter, D, and form the opposite part to simply make a bearing on the opposite side of the tool; or I can use four or other desired number of cutters.

A modification to which I attach much importance is shown in Fig. 4. Here the cutters D D are both made narrow and with an internal tapering bearing near each end to receive corresponding conical surfaces on the screw C. I make the holes in the thin ends of the cutters oblong in the direction transverse to the length. This allows that portion of the cutter as well as the other end to be adjusted outward and inward, if desired. The long holes receiving the pin B allow each cutter a limited amount of motion radially at that end; but it is essential to success that the thickness of the main portion of each cutter be such as to closely fill the slot $a$. The screw C in this modification is formed with two conical bearings, C' C$^2$, to act on the two ends of the cutters, as will be understood. In this modification, turning the screw C forces out both ends of each cutter D, or working the screw in the opposite direction allows the cutters D to move inward not only at the end adjacent to the screw, but also along the whole length of each. In this modification, or in the form first shown, the pin or pivot B may be omitted. I prefer to keep it in place as a means of preventing the cutters from becoming detached altogether from the bar. The hole in each cutter in which the pin stands may be made long enough to allow the slight adjustments required.

The form of the device shown in Fig. 6 is useful in preparing the bearings for what are known as "compensating journals for the flywheels of sewing-machines." They may be used in any situation where a tapering enlargement is to be produced at the end of a hole. The degree of the taper of the hole may be changed within narrow limits by turning the screw C so as to force the free ends of the cutters D farther apart or to allow them to draw nearer together.

I claim as my invention—

The reamer described, having the slotted bar A $a$, with one or more cutters, D, fitted therein and connected by an axial pin or pivot, B, in combination with each other and with an axial screw, C, having a tapering bearing, C', adapted to serve as herein specified.

In testimony whereof I have hereunto set my hand, at New York city, New York county, New York, this 24th day of June, 1882, in the presence of two subscribing witnesses.

VALENTINE MOESLEIN.

Witnesses:
   ALBERT M. SCHUCK,
   MAX COHEN.